US007025183B2

(12) United States Patent
Steffen et al.

(10) Patent No.: US 7,025,183 B2
(45) Date of Patent: Apr. 11, 2006

(54) PNEUMATIC SPRING PERCUSSION MECHANISM WITH AN ELECTRO-DYNAMICALLY ACTUATED DRIVING PISTON

(75) Inventors: Michael Steffen, München (DE); Rudolf Berger, Grünwald (DE); Wolfgang Schmid, München (DE)

(73) Assignee: Wacker Construction Equipment AG, Munich (DE)

( * ) Notice: Subject to any disclaimer, the term of this patent is extended or adjusted under 35 U.S.C. 154(b) by 0 days.

(21) Appl. No.: 10/503,681

(22) PCT Filed: Jan. 20, 2003

(86) PCT No.: PCT/EP03/00507

§ 371 (c)(1),
(2), (4) Date: Aug. 4, 2004

(87) PCT Pub. No.: WO03/066286

PCT Pub. Date: Aug. 14, 2003

(65) Prior Publication Data

US 2005/0076517 A1 Apr. 14, 2005

(30) Foreign Application Priority Data

Feb. 6, 2002 (DE) ................................ 102 04 861

(51) Int. Cl.
*F16F 15/03* (2006.01)

(52) U.S. Cl. ....................... 188/267; 173/114; 173/201

(58) Field of Classification Search ................ 188/267; 173/117, 114, 217, 171, 13, 104, 201
See application file for complete search history.

(56) References Cited

U.S. PATENT DOCUMENTS

| | | | | |
|---|---|---|---|---|
| 4,113,035 | A * | 9/1978 | Stiltz et al. | 173/201 |
| 4,215,297 | A * | 7/1980 | Jacquemet | 318/130 |
| 4,711,308 | A * | 12/1987 | Blaas et al. | 173/162.2 |
| 5,497,555 | A | 3/1996 | Averbukh | |
| 6,123,158 | A * | 9/2000 | Steffen | 173/217 |
| 6,520,269 | B1 * | 2/2003 | Geiger et al. | 173/117 |

FOREIGN PATENT DOCUMENTS

| | | |
|---|---|---|
| DE | 390 538 C | 2/1924 |
| DE | 43 03 363 A | 8/1994 |

* cited by examiner

*Primary Examiner*—Melanie Torres
(74) *Attorney, Agent, or Firm*—Boyle Fredrickson Newholm Stein & Gratz S.C.

(57) ABSTRACT

The invention relates to a pneumatic spring percussion mechanism comprising a driving piston moving back and forth in a housing of the percussion mechanism and a percussion piston, wherein a pneumatic spring is configured between the driving piston and the percussion piston. The movement of the driving piston can be transmitted to a percussion piston by means of said pneumatic spring. The driving piston can be driven by an electric linear motor and is connected to an aromatic of the linear motor, forming a single piece therewith. This arrangement makes it possible to eliminate the use of a conventional rotary motor and a crank mechanism to drive the driving piston.

13 Claims, 2 Drawing Sheets

PNEUMATIC SPRING PERCUSSION MECHANISM WITH AN ELECTRO-DYNAMICALLY ACTUATED DRIVING PISTON

BACKGROUND OF THE INVENTION

1. Field of the Invention

The invention relates to a pneumatic spring percussion mechanism in accordance with the preamble of claim 1.

2. Description of the Related Art

Pneumatic spring percussion mechanisms have been known for a long time, in particular for use in hammer drills and/or impact hammers. A common feature in the different types of pneumatic spring percussion mechanisms is that a driving piston moves axially in a reciprocating manner e.g. via a motor-driven crank drive. A percussion piston is co-axially disposed upstream of the driving piston in such a manner that a hollow chamber is formed, at least temporarily, between the driving piston and the percussion piston, which hollow chamber is sealed from the surroundings with the aid of the percussion mechanism housing. The air reservoir contained within the hollow chamber serves as a pneumatic spring when the driving piston moves and transfers the movement of the driving piston to the percussion piston so that this also follows the movement of the driving piston in a time-delayed manner and impacts against a tool shank or an intermediately connected riveting set.

Pneumatic spring percussion mechanisms are conventionally split into three groups. So-called pipe percussion mechanisms are thus known, wherein the driving piston and the percussion piston having the same diameter can move in the percussion mechanism pipe, as described for example in DE 198 43 644 A1. There are also so-called hollow piston percussion mechanisms, wherein the driving piston comprises a hollow recess on its end side in which the percussion piston can move (see DE 198 28 426 A1). The third group relates to hollow beater percussion mechanisms, wherein the percussion piston comprises a hollow recess on its end side facing the driving piston, in which recess the driving piston can move.

DE 198 28 426 A1 shows an example for an ordinary drive of the driving piston, wherein an electro-motor rotationally drives a crank shaft whose movement is transferred to the driving piston via a connecting rod and is transformed into an axial reciprocating movement.

It was always desirable to simplify the drive of the driving piston which is relatively costly in terms of mechanics. For this purpose, it was proposed e.g. in DE-PS 848 780 to drive the percussion piston with the aid of electromagnetic coils and to accelerate it against a tool shank. However, such a percussion mechanism is, in practice, subject to considerable thermal loads since the percussion piston is not only heated by the impact energy which is released during impact but also has eddy currents flowing through it, which in many cases even causes permanent damage to the percussion piston.

OBJECTS AND SUMMARY OF THE INVENTION

The object of the invention is therefore to provide a pneumatic spring percussion mechanism, wherein the mechanical drive of the driving piston can be simplified without accepting the disadvantages of electromagnetic percussion mechanisms of the Prior Art.

The object is achieved in accordance with the invention by a pneumatic spring percussion mechanism in accordance with Claim 1. Advantageous developments of the invention are given in the dependent Claims.

A pneumatic spring percussion mechanism in accordance with the invention is characterised in that the driving piston can be driven by an electrodynamic linear drive or an electrical linear motor and is preferably connected in one piece with an armature of the linear motor. This means that the percussion piston is itself not electromagnetically actuated, as is the case in the Prior Art, but rather the driving piston driving the percussion piston via the pneumatic spring is electromagnetically actuated.

This electrodynamic linear drive permits on the one hand that the ordinary drive motor as well as the gear mechanism (crank shaft, connecting rod) can be omitted, which results in considerable savings in terms of weight, constructional volume and costs.

On the other hand, there is no need to provide an idling path, which is common in known pneumatic spring percussion mechanisms. That is to say, in pneumatic spring percussion mechanisms of the Prior Art it must be possible that when the tool is lifted from the rocks which are to be worked upon, the percussion piston must move away by a certain amount from the driving piston in order to avoid further impact. In contrast thereto, owing to the invention it is possible to electrically control the movement of the driving piston in such a manner that the driving piston immediately stops when the tool acted upon by the pneumatic spring percussion mechanism is lifted from the rocks which are to be worked upon.

It is furthermore possible to construct the driving piston and the percussion piston in a manner suitable for operation and loading: whilst the percussion piston can be formed by giving consideration only to theoretical impacts with no consideration of electromagnetic influences, optimisation with respect to the magnetic return path can be achieved in the driving piston which is not going to be impacted.

With respect to the non-electromagnetically driven percussion piston, this means in particular that a design for a high striking speed in accordance with considerations in terms of strength or hardness can be effected, whereas no consideration has to be given to a magnetic return path, freedom from eddy currents etc. Furthermore, the percussion piston can be constructed so as to have a long length, which means that the impact retains a high amount of energy when the mechanical stress is as large as possible. Since no consideration is to be given to the magnetic return path, the percussion piston can be constructed so as to have a thin shank in order to be able to achieve an optimum transfer of energy to the tool. Finally, it is possible to ensure that the driving piston and the percussion piston co-operate with each other with the aid of a so-called dual pneumatic spring, as described for example in DE 197 28 729 A1. Consequently, in a particularly advantageous manner, constant impact and a uniform return motion of the percussion piston are possible under all recoil conditions and at different altitudes.

Furthermore, when forming the driving piston, a design in consideration of an optimum magnetic return path for a minimum thermal dissipation loss can be effected, simply by the choice of material.

In accordance with the invention, the driving piston is connected as one piece with the armature of the linear drive. In a particularly advantageous embodiment of the invention, the driving piston is formed substantially completely through the armature so that the armature simultaneously assumes the function of the driving piston.

In order to reduce eddy currents and thus optimise the thermal dissipation loss, it is particularly advantageous if the armature—and thus possibly the driving piston itself—is laminated, i.e., consists of superposed magnetic steel sheets. The thermal design is of considerable importance, as already explained above in connection with the Prior Art.

In an advantageous manner, the linear motor is a switched reluctance motor and comprises several drive coils in the percussion mechanism housing in the region of movement of the armature, which drive coils are switched in accordance with the desired movement of the driving piston.

However, consideration should be given to the fact that an electrodynamic drive e.g. in the form of a single electromagnetic coil is also regarded as a linear motor in connection with the invention, which electromagnetic coil serves as the drive coil for the driving piston. The driving piston can then be moved in the return direction e.g. via a helical spring or the like. The important feature is that the driving piston is tightly connected to the armature.

In an advantageous manner, a holding coil is provided in addition to the drive coils for holding the armature in a reference position or in an idling position. The holding coil does not serve for driving the driving piston and can thus produce a smaller amount of power.

In a particularly advantageous embodiment of the invention, control means are provided which excite the drive coils and/or the holding coil in accordance with the desired number, length and strength of impact as well as for the purpose of translating the desired movement patterns (stroke of the driving piston, path-time curves etc.).

In order to permit the drive coils or the holding coil to be controlled in a reliable manner, it is particularly expedient if the control means are supplied information regarding the current position of the driving piston and possibly of the percussion piston. For this purpose, a sensor device can be provided which determines the current position of the driving piston or of the armature but also of the percussion piston in the percussion mechanism housing.

As an alternative thereto, it is also possible that the control means determine the position of the driving piston or of the armature connected thereto owing to the behaviour of the current in the drive coils and/or in the holding coil. That is to say at the time when an armature accelerated by a coil has passed the coil, it has a generating effect and produces a current in the coil which reacts in the power supply system exciting the coil. This reaction can be detected by the control means and be evaluated.

The principle in accordance with the invention of a linear motor can be applied to all types of pneumatic spring percussion mechanisms, i.e., for pipe percussion mechanisms, hollow piston percussion mechanisms or percussion mechanisms with hollow percussion pistons. The return motion of the percussion piston can also be supported by a so-called return spring, as disclosed in DE 198 43 642 A1 and DE 198 43 644. A combination of the return spring and the principle in accordance with the invention of the driving piston coupled with the armature is explicitly regarded as part of the invention.

Owing to the omission of conventional drive principles having a motor and crank shaft, it is possible to construct a hammer drill and/or an impact hammer with the pneumatic spring percussion mechanism in accordance with the invention, whose outer housing is substantially cylindrical. Earth-boring and displacement work, for example, can also easily be carried out since the hammer can penetrate fully into the earth and can produce a longer channel ("soil displacement hammer").

BRIEF DESCRIPTION OF THE DRAWINGS

These and further advantages and features of the invention are explained in detail hereinunder with an example with the aid of the enclosed Figures, in which.

DETAILED DESCRIPTION OF THE PREFERRED EMBODIMENTS

Figure 1:
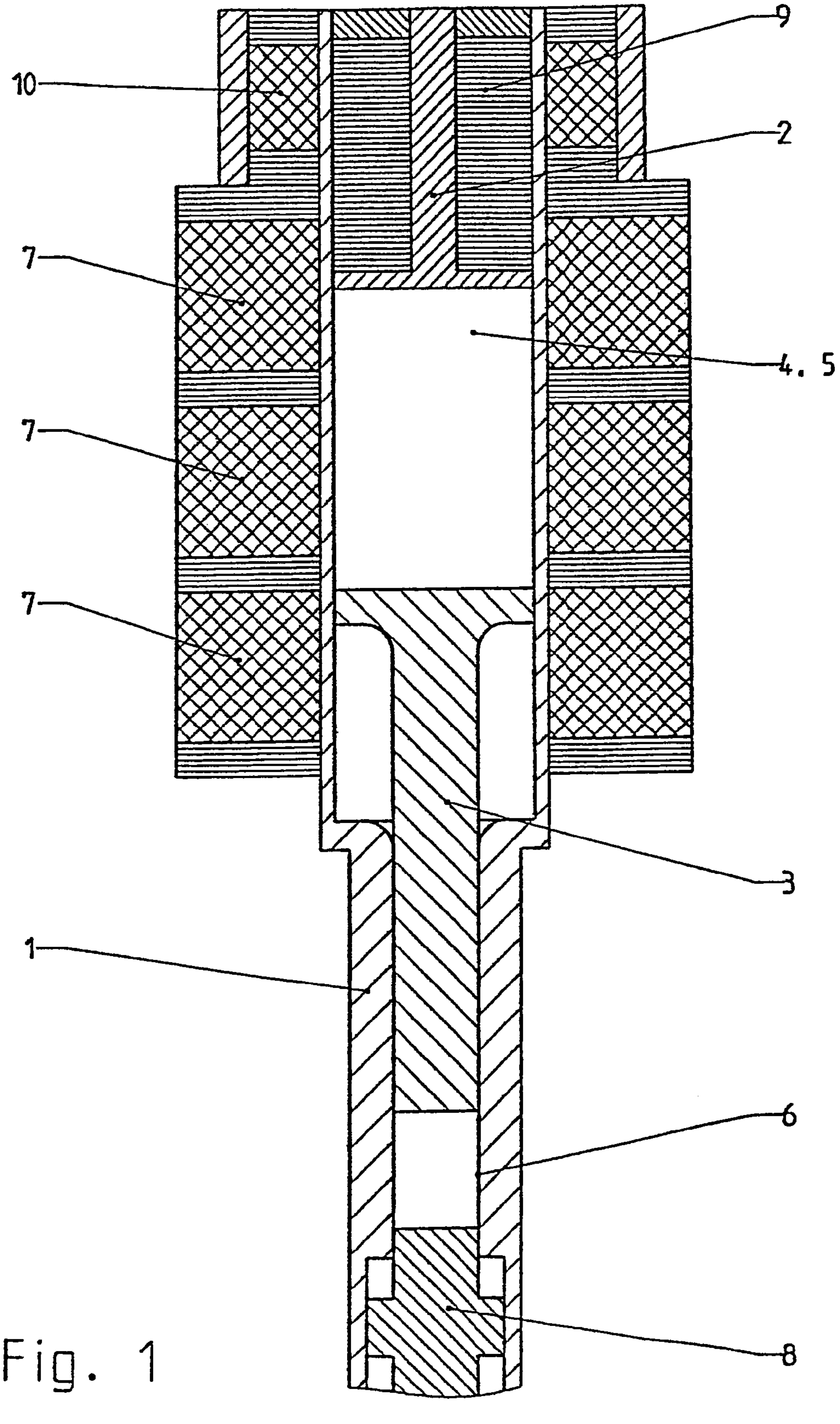
FIG. 1 schematically shows a pneumatic spring percussion mechanism in accordance with the invention, formed as a pipe percussion mechanism.

FIG. 1 shows an electrodynamic pipe percussion mechanism having a percussion mechanism pipe 1 which is a member of a percussion mechanism housing, a driving piston 2 which can move axially in the percussion mechanism pipe in a reciprocating manner, and a percussion piston 3 which can also move axially in the percussion mechanism pipe 1 in a reciprocating manner. The driving piston 2 and the percussion piston 3 have a substantially equal diameter. A hollow chamber 4 is formed between the driving piston 2 and the percussion piston 3, which hollow chamber receives a pneumatic spring 5. The guiding process of the longitudinally extending percussion piston 3 is also supported by a guide 6 provided in the percussion mechanism housing.

Three drive coils 7 are disposed around the percussion mechanism pipe 1 and are successively switched by control means, not illustrated, in a manner such that they accelerate the driving piston 2 and move it in a reciprocating manner.

Owing to the pneumatic spring 5, the movement of the driving piston 2 is transferred to the percussion piston 3 which is driven—to the left in FIG. 1—against a riveting set 8 and suddenly transfers its kinetic energy to the riveting set 8 and a tool shank, not illustrated, disposed thereafter. As a contrast thereto, the percussion piston 3 can also impact directly against the tool shank.

In order to obtain an optimum magnetic flow and thus a high magnetic efficiency of the drive coils 7 on the driving piston 2, the driving piston 2 carries an armature 9 which is a component of a linear motor formed from the armature 9 and the drive coils 7. The armature 9 is preferably formed in a laminated manner, as shown schematically in FIG. 1, i.e., it consists of several layers of suitable magnetic steel sheets.

The armature 9 shown in FIG. 1 thus also almost completely forms the driving piston 2.

A holding coil 10 is disposed behind the drive coils 7 as seen in the impacting direction and serves to hold the armature 9 and thus the driving piston 2 in a reference position. This reference position can also simultaneously be the idling position in which the driving piston 2 is held when work has been suspended. Since the holding coil 10 only has to provide a holding operation and not an accelerating operation, it can be formed with smaller dimensions.

In order to optimise the control of the drive coils 7, it is furthermore expedient to provide one or several sensors on or in the percussion mechanism pipe 1 which determine the exact position of the driving piston 2 or of the armature 9. As soon as the centre of the armature 9 itself moves over the centre of a corresponding drive coil 7, the armature 9 has a generating effect so that currents flow back into the network supplying the respective drive coil 7. Possibly undesired braking of the driving piston 2 would result, which can be avoided by the control means switching off the affected drive coil 7.

As an alternative thereto, it is also possible to evaluate the behaviour of the current of the drive coils 7 in order to determine the respective position of the driving piston 2 and the control measures for the drive coils 7 resulting therefrom.

Figure 2:
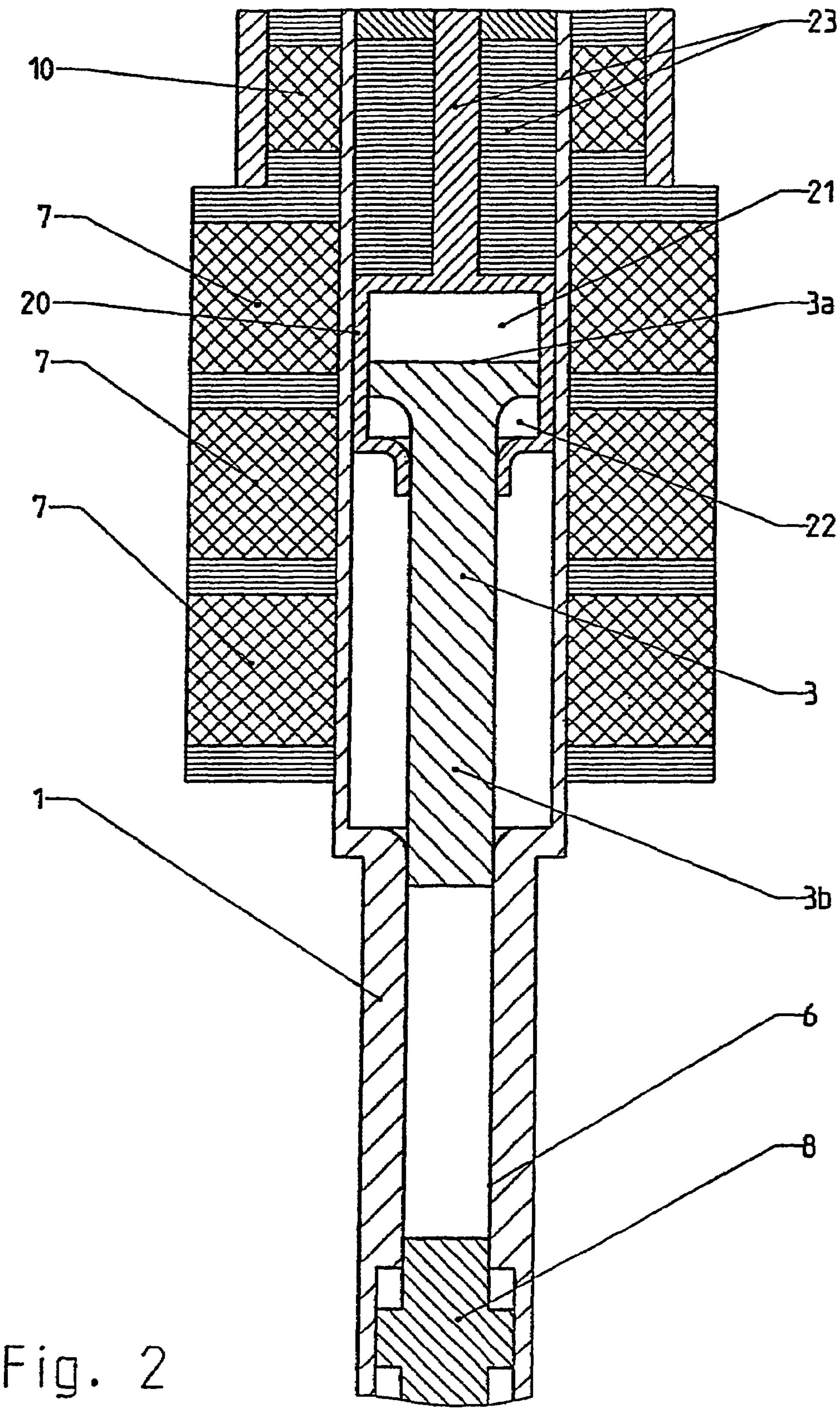
FIG. 2 schematically shows another pneumatic spring percussion mechanism in accordance with the invention, formed as a dual-acting hollow piston percussion mechanism.

FIG. 2 shows a dual-acting hollow piston percussion mechanism as the second embodiment of the invention. Like or similar components to those in FIG. 1 are referenced with like numerals.

In contrast to FIG. 1, the percussion piston 3 cannot be moved in the percussion mechanism pipe 1 but rather in a hollow recess of a driving piston 20 formed as a hollow piston. The driving piston 20 surrounds the percussion piston 3 in such a manner that a hollow chamber having a first pneumatic spring 21 is formed behind a piston head 3*a* of the percussion piston 3, as seen in the impacting direction, and a second pneumatic spring 22 is formed in front of the piston head 3*a*. A shank 3*b* of the percussion piston 3 penetrates the end side of the driving piston 20 and extends over a longer length. The shank 3*b* is formed so as to strike against the riveting set 8.

The two pneumatic springs 21 and 22 permit impact which is particularly reliable and constant as well as enabling the percussion piston 3 to be uniformly recoiled after impact has occurred under all recoil conditions and at different altitudes.

The driving piston 20 is connected as one piece with an armature 23, wherein the armature 23 is moved by the drive coils 7 or is held by the holding coil 10 in the manner already described in connection with FIG. 1.

We claim:

1. A pneumatic spring percussion mechanism comprising a percussion mechanism housing, a driving piston which moves in the percussion mechanism housing in a reciprocating manner, a percussion piston, and a pneumatic spring which is formed in a hollow chamber between the driving piston and the percussion piston and via which the movement of the driving piston is transferred to the percussion piston, wherein the driving piston is driven by an electrodynamic linear drive and is connected to an armature of the linear drive.

2. The pneumatic spring percussion mechanism as claimed in claim 1, wherein the driving piston carries the armature or is substantially completely formed through the armature.

3. The pneumatic spring percussion mechanism as claimed in claim 1, wherein the armature is laminated.

4. The pneumatic spring percussion mechanism as claimed in claim 1, wherein the linear drive is a switched reluctance motor.

5. The pneumatic spring percussion mechanism as claimed in claim 1, wherein a sensor device is provided for determining a position of at least one of the armature, the driving piston, and the percussion piston.

6. The pneumatic spring percussion mechanism as claimed in claim 1, wherein the percussion piston and the driving piston have substantially the same diameter and can move in a percussion mechanism pipe which is a member of the percussion mechanism housing.

7. The pneumatic spring percussion mechanism as claimed in claim 1, wherein the percussion piston comprises a hollow recess on an end side, in which recess the driving piston moves, and wherein the armature moves outside the percussion piston in the percussion mechanism housing.

8. A hammer drill and/or impact hammer having a pneumatic spring percussion mechanism as claimed in claim 1, wherein an outer housing of the hammer drill and/or impact hammer is substantially cylindrical.

9. A pneumatic spring percussion mechanism comprising:

a percussion mechanism housing, a driving piston which move in the percussion mechanism housing in a reciprocating manner, a percussion piston, and a pneumatic spring which is formed in a hollow chamber between the driving piston, and the percussion piston and via which the movement of the driving piston is transferred to the percussion piston, wherein the driving piston is driven by an electrodynamic linear drive and is connected to an armature of the linear drive, wherein at least one or several drive coil of the linear drive is disposed in the percussion mechanism housing in the region of movement of the armature; and wherein, a holding coil is provided for holding the armature in a reference position.

10. The pneumatic spring percussion mechanism as claimed in claim 9, wherein the drive coils and/or the holding coil can be controlled by a controller at least with respect to the length and strength of their electrical excitation as well as for the purpose of adjusting idling operation.

11. The pneumatic spring percussion mechanism as claimed in claim 10, wherein a position of the armature can be determined by the controller by monitoring the behavior of the current in the drive coils and/or in the holding coil.

12. A pneumatic spring percussion mechanism comprising:

a percussion mechanism housing, a driving piston which moves in the percussion mechanism housing in a reciprocating manner, a percussion piston, and a pneumatic spring which is formed in a hollow chamber between the driving piston and the percussion piston and via which the movement of the driving piston is transferred to the percussion piston, wherein the driving piston is driven by an electrodynamic linear drive and is connected to an armature of the linear drive, and wherein the driving piston has a hollow recess in which the percussion piston moves.

13. The pneumatic spring percussion mechanism as claimed in claim 12, wherein the driving piston surrounds the percussion piston in front of and behind it, as seen in the impacting direction, in such a manner that the pneumatic spring is disposed behind the percussion piston and that a second pneumatic spring is formed between the driving piston and the percussion piston in front of the latter.

* * * * *

UNITED STATES PATENT AND TRADEMARK OFFICE

CERTIFICATE OF CORRECTION

PATENT NO. : 7,025,183 B2
APPLICATION NO. : 10/503681
DATED : April 11, 2006
INVENTOR(S) : Steffen et al.

It is certified that error appears in the above-identified patent and that said Letters Patent is hereby corrected as shown below:

IN THE CLAIMS

| | |
|---|---|
| CLAIM 9<br>Col. 6, Line 15 | Replace “move” with moves--. |
| CLAIM 9<br>Col. 6, Line 20 | Replace “piston, and” with --piston and--. |
| CLAIM 9<br>Col. 6, Line 21-22 | The clause “the percussion piston and via which the movement of the driving piston is transferred to the percussion piston,” should be moved to the end of line 20 following the words “piston and”. |
| CLAIM 9<br>Col. 6, Line 26 | Replace the word “coil” with --coils--. |

Signed and Sealed this

Twenty-second Day of August, 2006

JON W. DUDAS
*Director of the United States Patent and Trademark Office*